FREQUENCY CODE CONCEPT ALPHABET SYNTHESIZING

Filed Nov. 30, 1967 14 Sheets-Sheet 1

INVENTOR
ETIENNE P. GOROG

BY William N. Barnett
ATTORNEY

United States Patent Office 3,478,350
Patented Nov. 11, 1969

3,478,350
FREQUENCY CODE CONCEPT ALPHABET SYNTHESIZING

Etienne P. Gorog, Scarsdale, N.Y., assignor to International Business Machines Corporation, Armonk, N.Y., a corporation of New York Filed Nov. 30, 1967, Ser. No. 686,895
Int. Cl. G08b 1/00; H04l 3/00; H03k 13/00
U.S. Cl. 340—351 11 Claims

ABSTRACT OF THE DISCLOSURE

A method for transfer of data from a transmitter to a receiver over a transmission link having frequency constraints by generating sequences of electrical signals which by their contributions of bits inherently possess the required spectral distribution to satisfy these constraints and applying these signal sequences to the transmission link.

BACKGROUND OF INVENTION

Field of the invention

The invention generally pertains to the field of data transmission and specifically to a method of data transmission which conforms the spectrum of the data transmitted to frequency constraints existing in the transmission link.

Description of the prior art

The prior art has had as an objective the obtaining of a zero frequency contribution at $f=\frac{1}{2}T$ to reduce bandwidth, at $f=0$ in order to eliminate the necessity for transmitting D.C. The prior art utilizing random signal sequences has sought to obtain a reduction of the required frequency spectrum by specific restrictions on three level signals. This has been generally accomplished by single bit or double bit encoding.

By extending bit coding to "$n$" digit character coding, applicant's invention not only achieves the objectives of the prior art by utilizing a novel approach but goes beyond this to provide a general solution and method whereby the signal spectrum of transmited data may be configured with maximum flexibility to achieve zero frequency contribution at selected points, maximum frequency at selected points etc.

SUMMARY OF THE INVENTION

The method of the present invention is to generate alphabets which consist of sequences of signals which will present predetermined frequency contribution at points $1/kT$, wherein the frequency contribution is pre-established.

These aliphabets are composed of unique $(n, m, k)$ sequences where $n$ is the number of elements in the sequence, $m$ is the digit level (binary, ternary, etc.), and $k$ is the indicia of randomness.

These objectives are relatively uncomplicated and apparent because they solve recognizable problems. However the concept of establishing frequency contribution at points $1/kT$ solves other problems. If a frequency contribution of zero is to be established with $k=4$ at points $\frac{1}{4}T$, $\frac{3}{4}T$, $1/T$ (where $L/k$ are relatively prime), etc., there would be no frequency energy at these points which would allow other features or applications at these frequencies. As an example, at the transmission speed of 3000 bits/sec. the frequency spectrum envelope of the alphanumeric alphabet is very close to the available frequency bandwidth of the Public Telephone Network in U.K.

It is, in summary, the most generic object of this invention to provide a method for generating signal sequences which will have a predetermined spectrum.

It is an object of this invention to provide a method for generating signal sequences which will have a minimum, and/or maximum frequency contribution at selected frequency points.

It is further one of the objectives of this invention to provide a method for establishment of natural frequency multiplexing systems by maximizing frequency contribution at specific sections of the spectrum.

Another object of this invention is to provide a method for bit multiplexing in which signal sequences from two sources can be interspersed to form a signal sequence for optimum transmission.

The foregoing and other objects, features and advantages of the invention will be apparent from the following more particular description of preferred embodiments of the invention, as illustrated in the accompanying drawings.

73—307; 200—61.41

Figure 6:
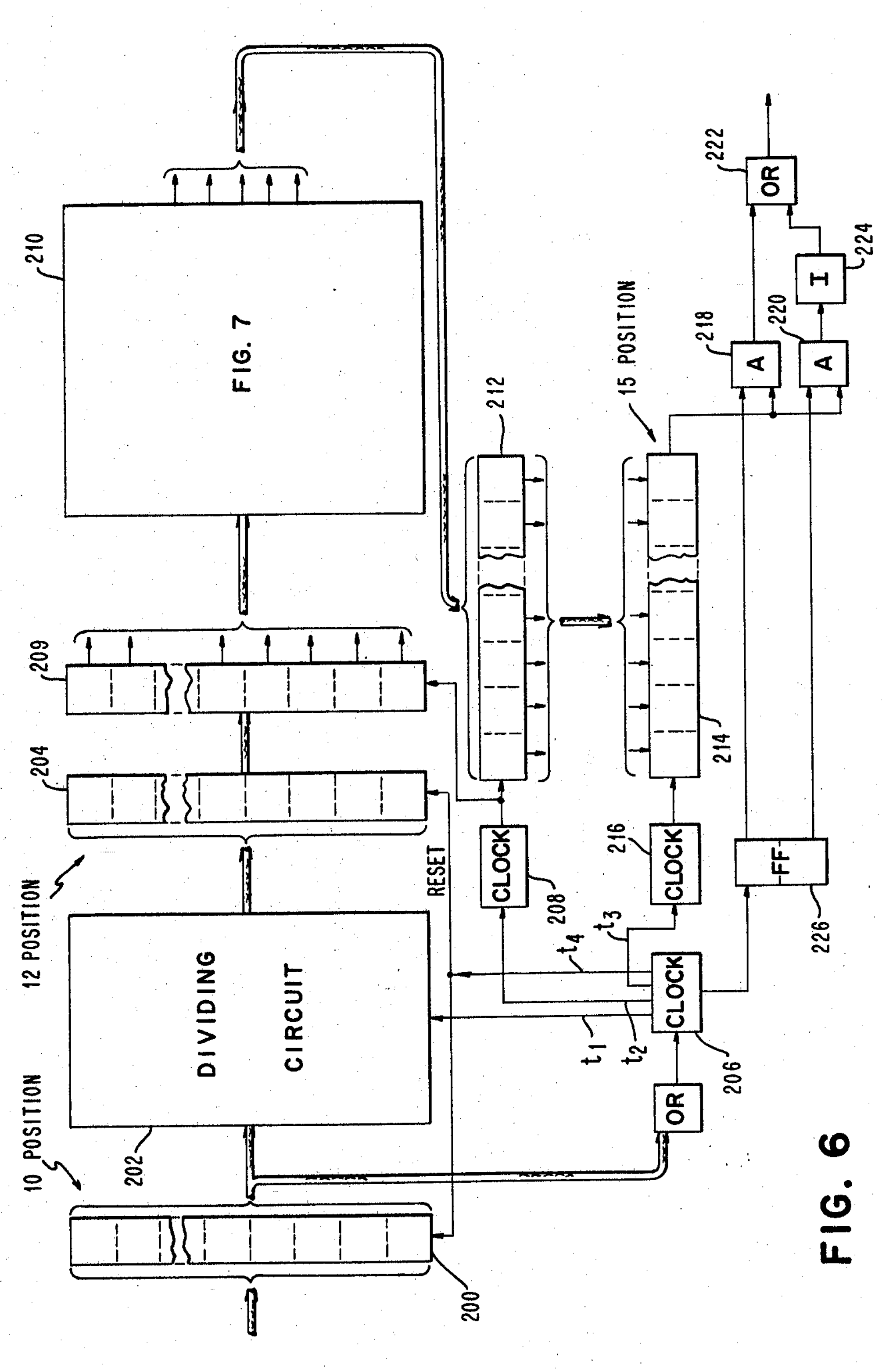
FIG. 6 is apparatus suitable for synthesizing signal sequences where $k=3$, $m=2$, $n=15$ with no D.C. at $f=0$.
Figure 7:
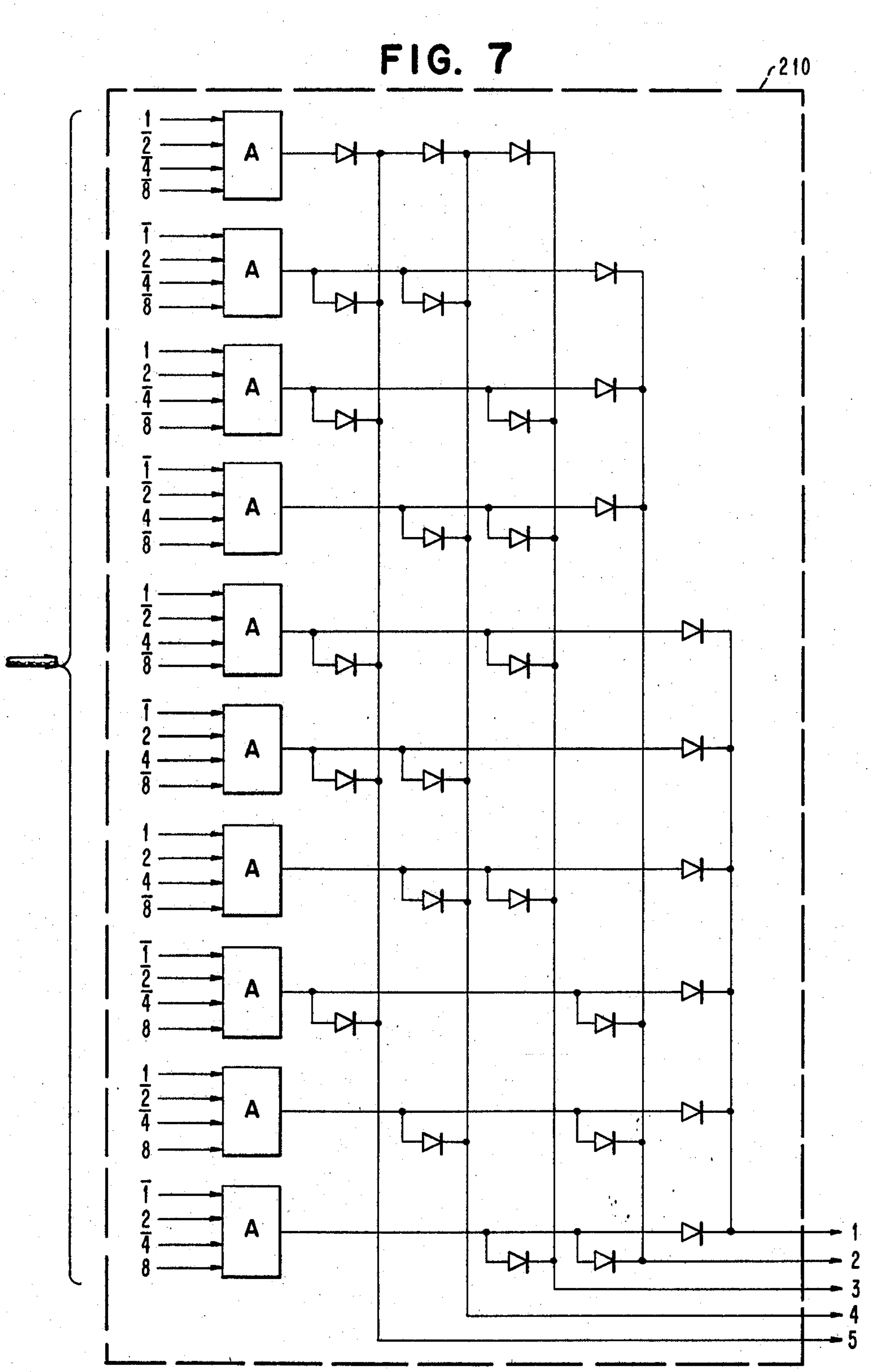

FIG. 7 is a translator circuit for use with the apparatus of FIG. 6.

Figure 8A:
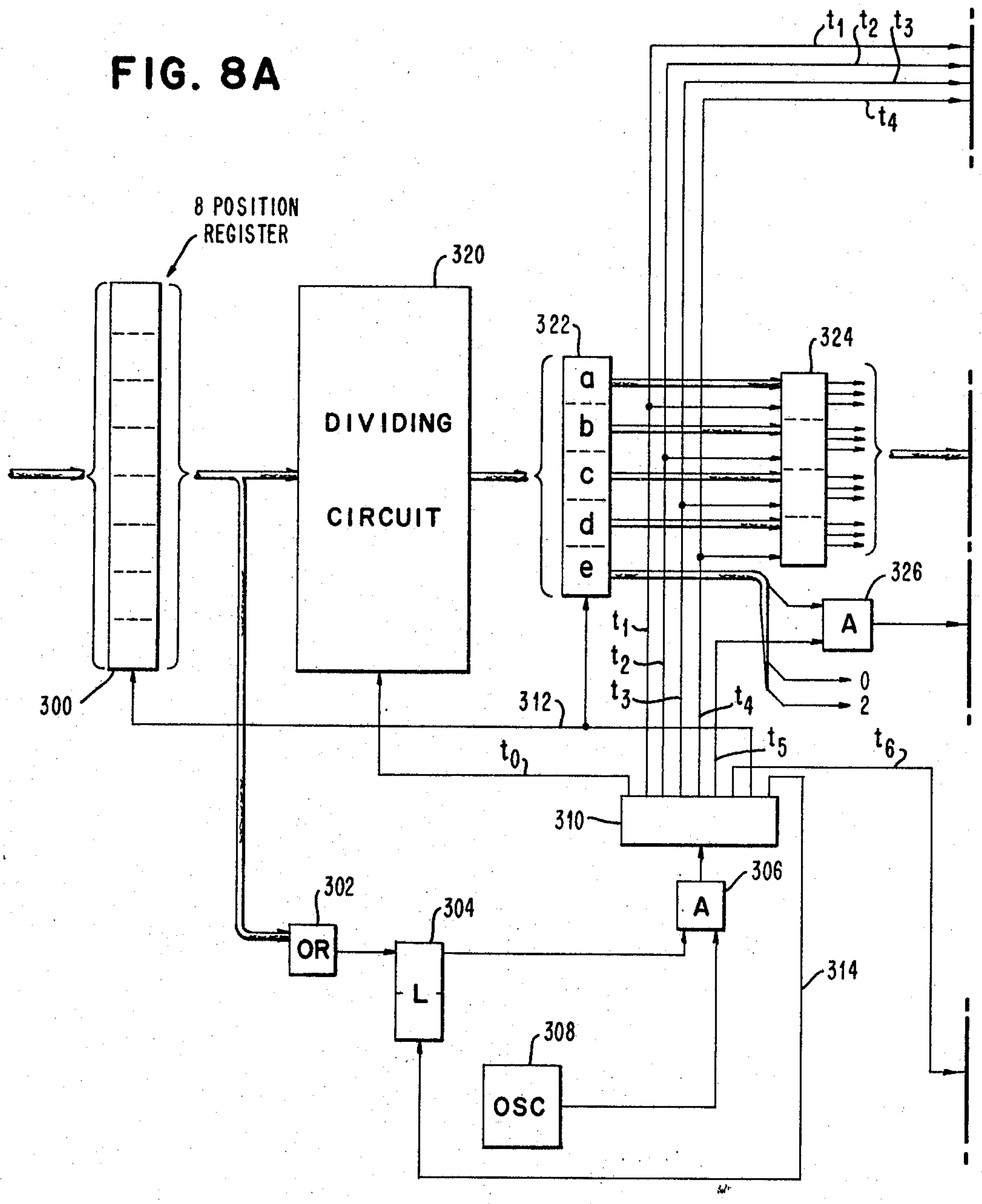
Figure 8B:
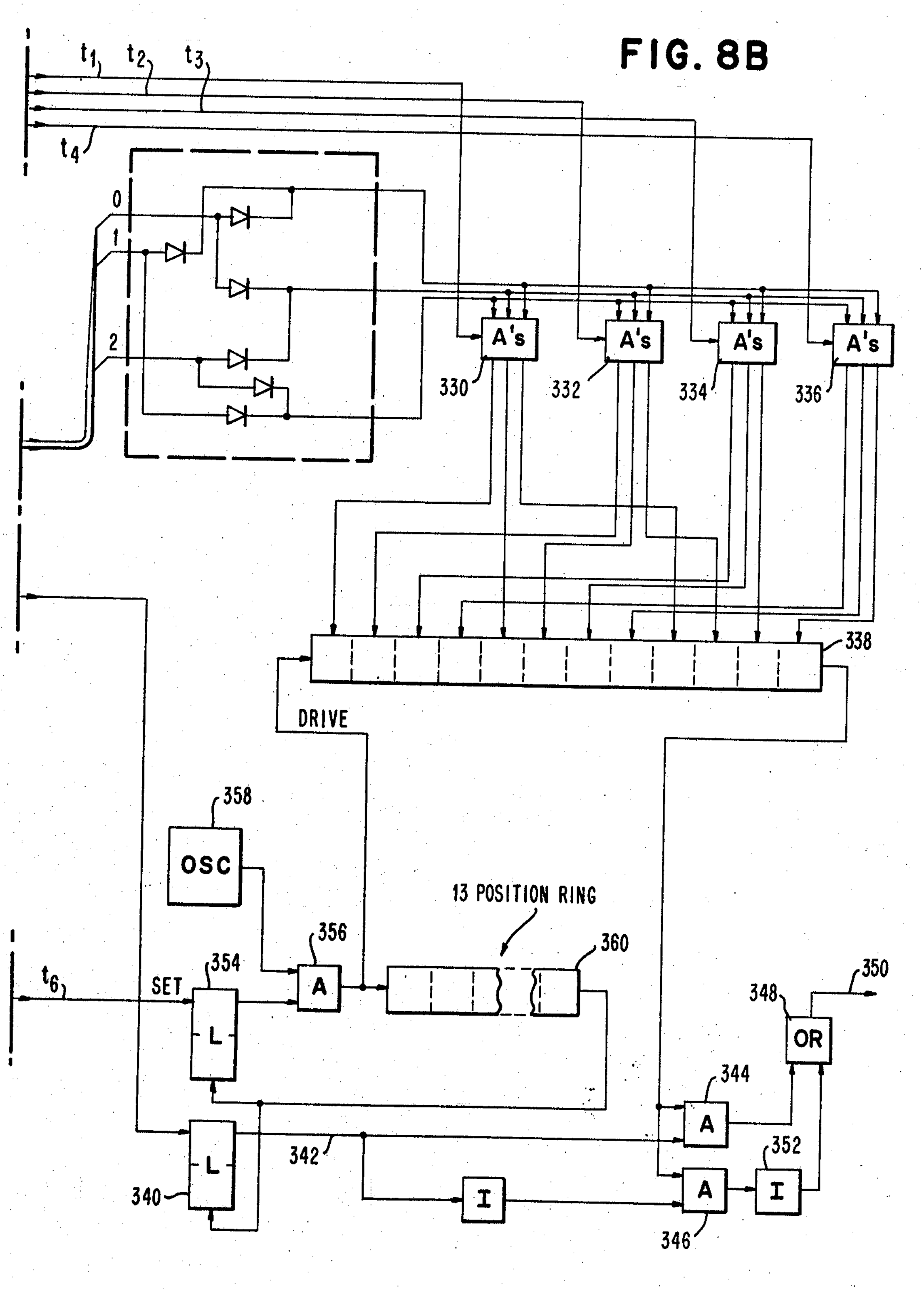

FIG. 8 consisting of FIGS. 8A and 8B is apparatus suitable for synthesizing signal sequences where $k=4$, $m=2$, $n=12$ with D.C. at $f=0$.

Figure 9:
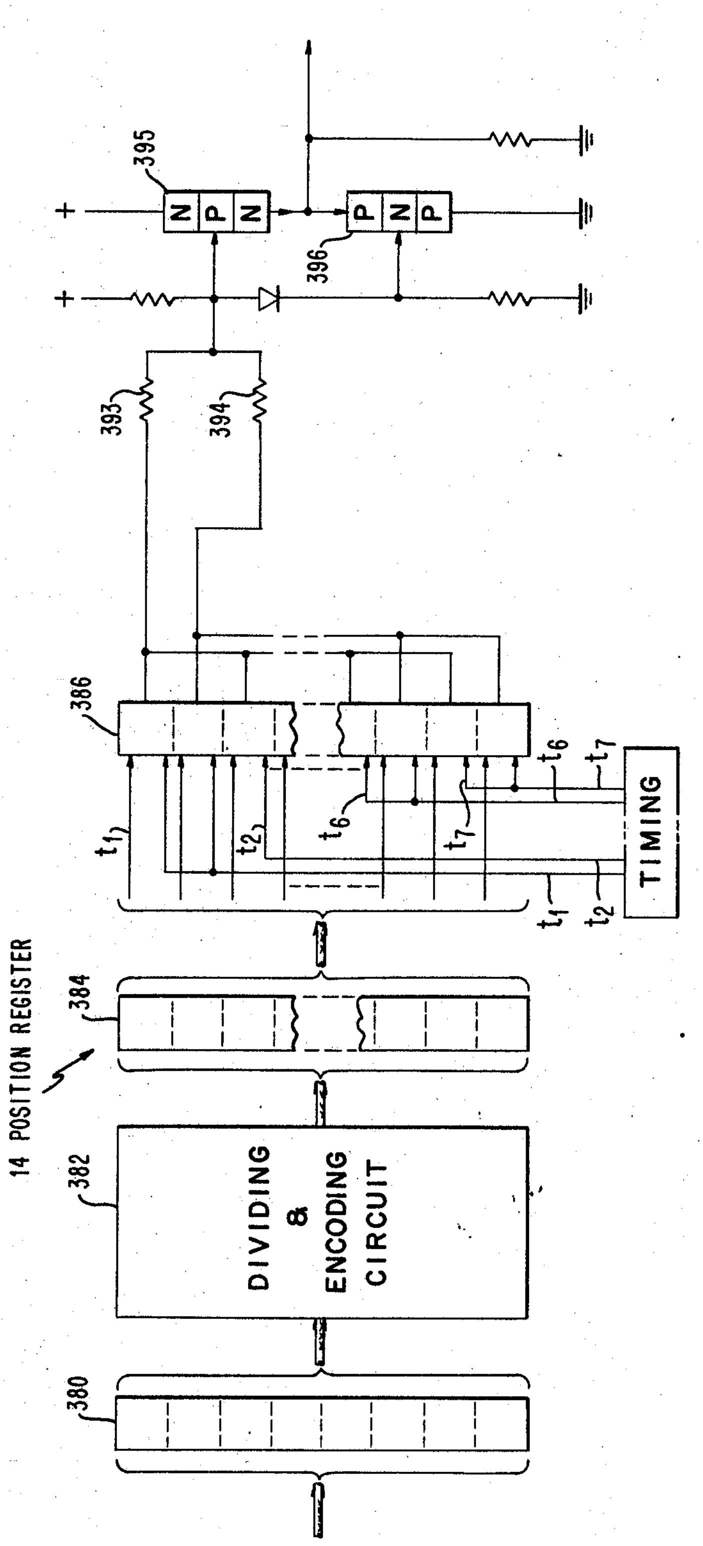

FIG. 9 is apparatus suitable for synthesizing signal sequences where $k=2$, $m=3$, $n=7$ with no D.C. at $f=0$.

Figures 5A, 10:
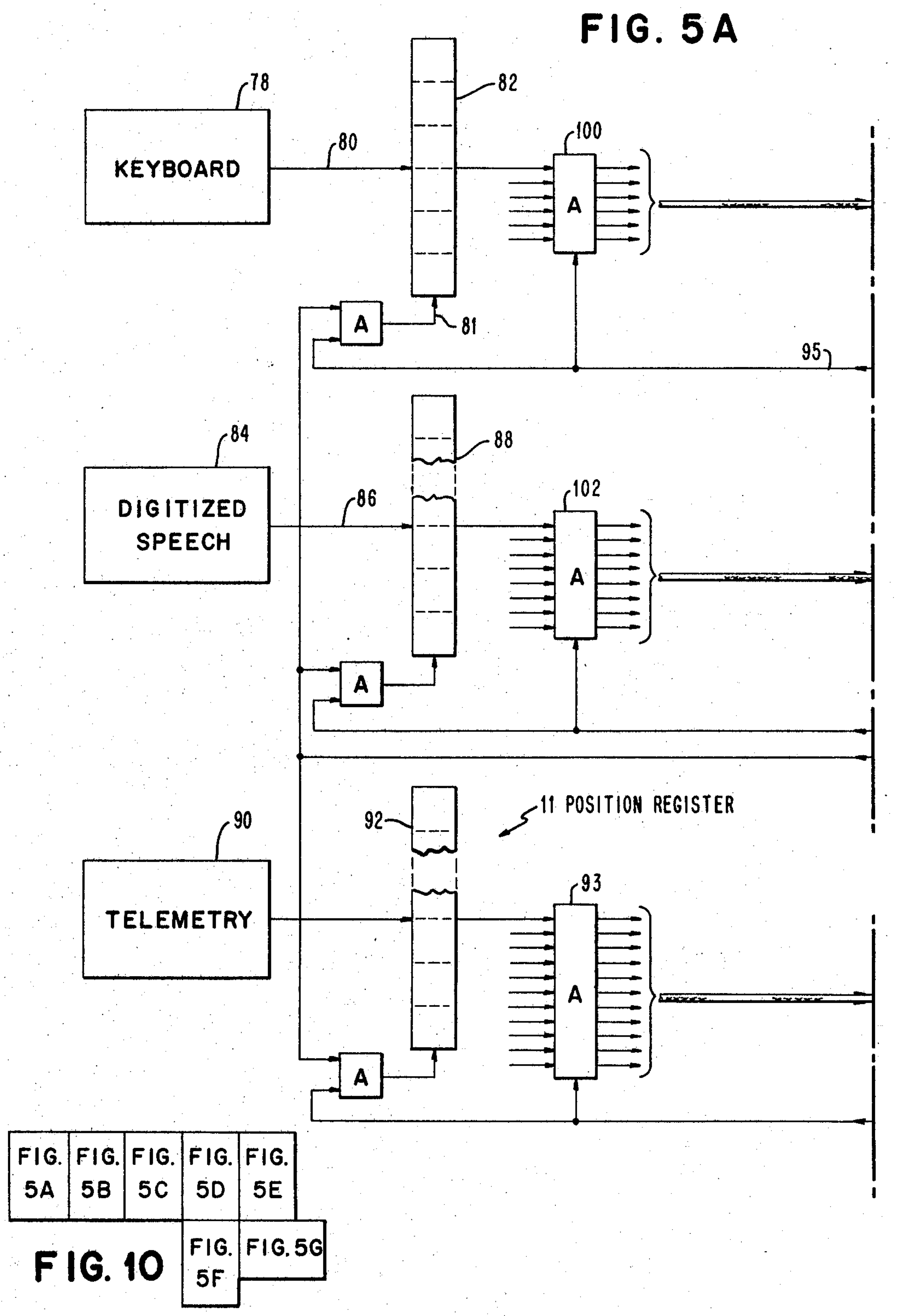
FIG. 5 consisting of FIGS. 5A–5G is apparatus suitable for synthesizing signal sequence where $k=2, 3, 4$, $m=2$ and $n=8$, 12 and 16 with no D.C. at $f=0$.

FIG. 10 is an illustration of how FIGS. 5A–5G are to be joined together to form FIG. 5.

Figure 11:
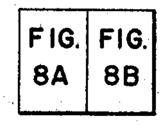

FIG. 11 is an illustration of how FIGS. 8A and 8B are to be joined together to form FIG. 8.

DESCRIPTION OF THE PREFERRED EMBODIMENT

General

Figure 1:
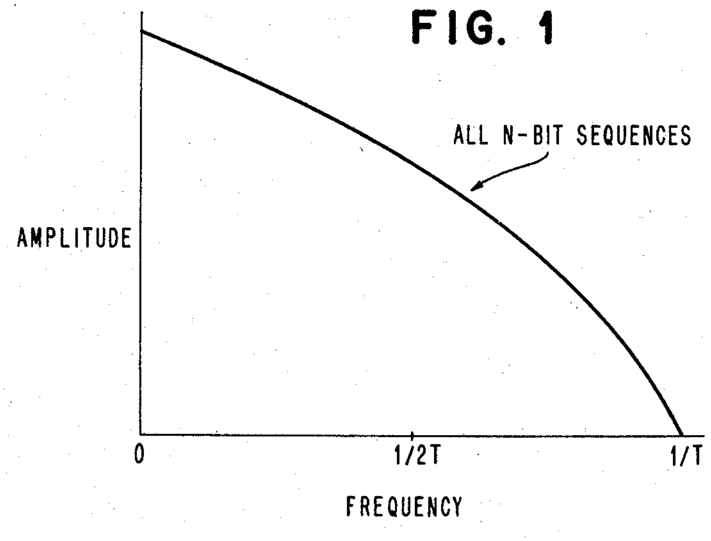
FIG. 1 is a frequency spectrum of a binary random alphabet.

The frequency spectrum of a binary random code is shown in FIG. 1. As can be seen, the energy level slopes from a maximum of $f=0$ to a minimum of $f=1/T$, where T is equal to $2\pi f$. There are lobes of energy at higher frequencies but these are not necessary to the recovery of the intelligence being transmitted. In any ordinary data transmission these higher lobes of energy would be eliminated by filtering. The minimum spectrum required in a binary detection system for the recovery of intelligence is referred to as the Nyquist limit and is at $\frac{1}{2}$T. In terms of frequency, it is possible to transmit $2f$ values/sec. in a channel of "$f$" bandwidth or $f$ values/sec. in a channel of $f/2$ bandwidths.

Figure 2:
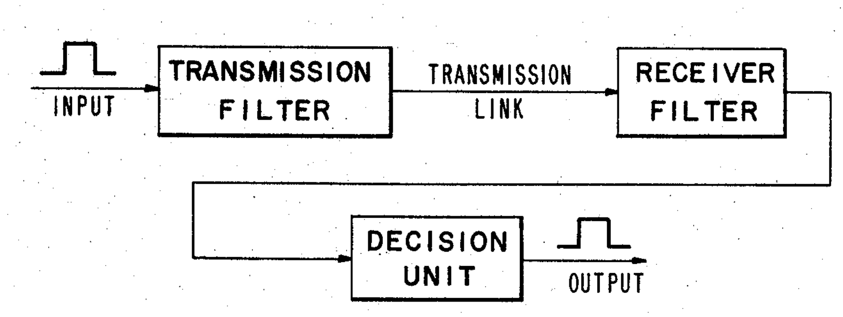
FIG. 2 is a schematic illustration of a transmitter-receiver.

A basic baseband data transmission system is shown in FIG. 2. Data is shown being introduced as binary pulses at an input to a filter to limit the signal spectrum being applied to the transmission line. The higher frequencies of the rectangular pulse input are thus prevented from interfering with other communication service or initiating cross-talk. A receiving low-pass filter excludes noise and interference which may be part of the transmission link. A decision unit interprets the data being presented.

Figure 3:
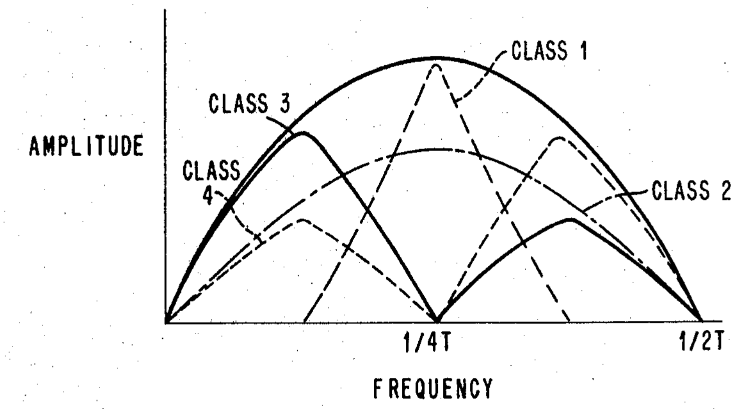
FIG. 3 is the frequency spectrum of an alphabet generated in accordance with applicant's invention.

FIG. 3 is a frequency spectrum of a set or alphabet of signal sequences generated in accordance with applicant's invention. There is a spectrum of zero frequency contribution at $f=0$ which is desirable in that no D.C. is required for intelligence and may be used to power repeaters. The major portion of the signal spectrum is also between $f=0$ and $f=\frac{1}{2}T$ and thus is a reduction by a factor of 2 over the random sequences.

The basic theory of the present invention is found in the following brief exposition where general alphabets are studied.

The sequences of signals are:

$$a_0, a_1, a_2, \ldots a_{n-1}$$

and are generated to satisfy the relationships such that:

$$K(kT) \sum_{i=0}^{i=n-1} a_i e^{\frac{-j2\pi}{k}} = C_k e^{-iP_k}$$

which defines the frequency contribution of the data at the frequency $f=1/kT$.

K($k$T) is equal to:

$$\frac{1-\exp(-j2\pi fT)}{j4\pi^2 f}$$

and is independent of digit configurations in the sequences to be transmitted.

If the frequency contributions is zero over the entire spectrum, the relationship above requires $a_i=0$ for all $0 \leq i \leq n-1$. Therefore we chose to represent $a_i$ by $+1$ or $-1$ in the binary case, by $+1$, $0$, $-1$ in the ternary case, by $+3$, $+1$, $-1$, $-3$ in the quaternary case, etc.

The terms of the above relationship are defined as follows:

(1) $a_i$ is an element of an $n$-bit sequence of the form $a_0, a_1, a_2 \ldots a_{n-1}$ (2) T is the signal element duration (3) $1/T$ is the rate of signal generation (4) $k$ is a constant 1, 2, 3, etc., (5) $F=1/kT$ is the point of frequency constraint being considered (and multiples where the numerator and $k$ are relatively prime, (6) C is a constant which takes discrete values going from 0 to some maximum and fixing the amplitude frequency contribution at points $1/kT$, (7) P is a constant angle which also takes some discrete values going from and fixing the phase frequency contribution (compatible with the amplitude) at points $1/kT$.

With $C=0$, K($k$T) which is independent of $a_i$ disappears with zero frequency contribution. With the amplitude $C=0$, the expression $$C_k e^{iP_k}=0$$

An $m$-element alphabet with preselected zero frequency contribution ($C=0$) at $$f=\frac{1}{k_1T}, f=\frac{1}{k_2T}, f=\frac{1}{k_3T}$$

etc., is the intersection of the $m$-level, $n$ element alphabet with zero frequency contribution at $f=1/k_1T$ the $m$-level, $n$ element alphabet with zero frequency contribution at $f=1/k_2T$, $f=1/k_3T$, etc.

Every character code $a$ is a sequence:

$$a_0, a_1, a_2, \ldots a_{n-1}$$

such that (I)
$$\sum_{i=0}^{i=n-1} a_i e^{\frac{-j2\pi i}{k}}=0$$

Since $e^{-j2\pi}=1$, Equation I can be written:

(II)
$$\sum_{i=0}^{i=k-1} e^{\frac{-j2\pi i}{k}} \left( \sum_{r=0}^{r=\frac{n}{k}-1} a_{rk+i} \right)=0$$

The quantity under the second sum is denoted:

(III)
$$A_i=\sum_{r=0}^{r=\frac{n}{k}-1} a_{rk+i}$$

Equation II then becomes:

(IV)
$$\sum_{i=0}^{i=k-1} A_i e^{\frac{-j2\pi i}{k}}=0$$

(1) If $k$ is prime: The necessary and sufficient conditions satisfying (I) are (V)
$$A_0=A_1= \ldots A_{k-1}$$

This corresponds, in mechanics, to the case where the forces (or the vectors) are in equilibrium.

(2) $k$ is not a prime number: Suppose $k=cxd$, solutions like:

(VI)
$$A_0=A_c=A_{2c}= \ldots A_{(d-1)c}$$
$$A_1=A_{c+1}=A_{2c+1}= \ldots A_{(d-1)c+1}$$
$$\vdots$$
$$A_{c-1}=A_{2c-1}=A_{3c-1}= \ldots A_{k-1}$$

will satisfy Equation I.

Other solutions exist $m>2$ (3) $n$ is a multiple of $k$: If Equation I is to be systematically satisfied over each single character $n$ must be a multiple of $k$. Solutions (V) or (VI) not exist otherwise.

(4) $n$ is not a multiple of $k$: Alphabets still exist, but the characters and the number of characters within a given message must follow specific rules.

For example $k=3$ and $n=4$ with $m=2$. The code can be defined as $$A_0=A_1+C=A_2+C$$

but the message must be constituted of a multiple of 3 characters. Indeed it is easy to see that for any group of 3 characters, or 6, or 9, etc. . . . we will get $$A'_0=A'_1=A'_2=3A_0+2C$$

Study of alphabets with zero frequency contribution of 0 at $f=0$ and $f=1/kT$. The alphabet is determined by (VII)
$$\sum_{i=0}^{i=n-1} a_i=0$$

or (VIII)
$$\sum_{i=0}^{i=k-1} A_i=0$$

(1) $k$ is prime: These alphabets will satisfy (V) and (VIII) that is:

$$A_0=A_1= \ldots A_{k-1}=0 \qquad \text{(IX)}$$

In the special case where $n=2k$ and $m=2$ the alphabets consist of $2^k$ characters or $k$ information bits. These particular systems can be characterized by a signal-element:

$$\underbrace{100 \cdots 0}_{k} \quad \underbrace{-100 \cdots 0}_{k}$$

In general, if $A_i=0$ has C solutions where $C>2$, the total alphabet, which will consist $C^k$ elements, will not be characterized by any "signal elements."

(2) $k$ is not prime: The solution will be given by satisfying simultaneously (VI) and (X) where Equation X is defined by $$A_0+A_1+ \ldots A_{c-1}=0 \qquad \text{(X)}$$

(3) $n$ is a multiple of $2k$: In the case where $m$ is even, Equation VIII can be satisfied over each single character only if $n$ is a multiple of $2k$ $$n \equiv 0[2k] \qquad \text{(XI)}$$

The probability (in general) to have Equation XI satisfied is equal to $\frac{1}{2}k$ (4) $n$ is not a multiple of $2k$: Alphabets still exist and the procedure which will insure the required frequency characteristics is the following:

The alphabets must be constructed such that, after $b$ consecutive characters, each $A_i$ is equal to a given non-zero value. (See examples in paragraph 4, immediately preceding this section.)

It will then be necessary to invert each group of $b$ consecutive character

It will be noticed that we will have: $1 \leq b \leq k$.

(5) $k$ is a rational number: This study was made for $k$ being any integer, but it can easily be extended to any rational numbers.

Every alphabet with zero frequency contribution at $f=1/kT$ is also an alphabet with zero frequency contribution at $$1/k/x$$

if and only if $k$ and $x$ are relatively prime.

The total "$n$" element alphabet has been denoted $$\alpha=(a_0,a_1,a_2 \ldots a_{n-1})$$

In view of the above discussion, let us denote:

$$\alpha=(a_j,a_{j+k}, \ldots a_{j+n-k})$$

for $$j=0,1 \ldots k-1$$

where "$k$" is the factor $1/kT$ which establishes the frequency contribution at $1/kT$ and multiples thereof (if $k$ and the numerator to the multiple are relatively prime).

Where $k$ is established, there will be subalphabets or basic codes $\alpha_j$ such that for example if $k=2$, and $n=8$ $$\alpha_0=(a_0,a_2,a_4,a_6)$$

$$\alpha_0=(a_1,a_3,a_5,a_7)$$

If $A_j$ is equal to the total sum of the elements in $\alpha_j$ $$A_0=a_0+a_2+a_4+a_6$$

and $$A_1=a_1+a_3+a_5+a_7$$

a relationship as in this instance of $A_0=A_1$ states the proposition that the sum of the elements in these subalphabets or codes are equal.

In the generation of an alphabet where $k=2$, (a prime number) $n=8$, (a multiple of $k$) $m=2$ (see FIG. 3 for frequency distribution), $$A_0=A_1$$

or $$A_0=a_0+a_2+a_4+a_6=a_1+a_3+a_5+a_7=A_1$$

There are obviously 16 different sub codes:

| Subcode | Number |
|---|---|
| XXXX | 1 |
| 0XXX<br>X0XX<br>XX0X<br>XXX0 | 4 |
| X00X<br>00XX<br>0X0X<br>0XX0<br>X0X0<br>XX00 | 6 |
| X000<br>0X00<br>00X0<br>000X | 4 |
| 0000 | 1 |

The number of equal relationships in which can exist are:

$[XXXX]=1^2=1$
$[X0XX, \text{etc.}]=4^2=16$
$[X00X, \text{etc.}]=6^2=36$
$[X000, \text{etc.}]=4^2=16$
$[0000]=1^2=1$ 70—Total If it is required that the frequency contribution at $f=0$ be zero, there will be only thirty-six characters in the final alphabet because it is only the relationship of two out of four which provides as many zeros as ones.

In the actual data transmission the current transition would take place about zero so that logic zero would be —1 while logic 1 would be equal and opposite.

The basic alphabet with a zero contribution at $f=0$ would therefore be:

(1) 0011
(2) 0101
(3) 0110
(4) 1001
(5) 1010
(6) 1100

The final eight bit alphabet consists of these four-bit codes interleaved with another (or the same) four bit code:

Thus (1) 0011 would form with (1) 0011 the character 00001111,
with (2) 0101 the character 00011011,
with (3) 0110 the character 00011110, etc.

This is a natural alphanumeric code. Reproduced below is the complete set with corresponding numerals and alphabetic character:

| Letter | Binary pattern | Spectrum class |
|---|---|---|
| 0 | 11001100 | 1 |
| 1 | 01100110 | 1 |
| 2 | 00110011 | 1 |
| 3 | 10011001 | 1 |
| 4 | 11100100 | 2 |
| 5 | 01110010 | 2 |
| 6 | 00111001 | 2 |
| 7 | 10011100 | 2 |
| 8 | 01001110 | 2 |
| 9 | 00100111 | 2 |
| A | 10010011 | 2 |
| B | 10100101 | 3 |
| C | 11010010 | 3 |
| D | 11001001 | 2 |
| E | 00011011 | 2 |
| F | 01101001 | 3 |
| G | 10110100 | 3 |
| H | 10001101 | 2 |
| I | 11000110 | 2 |
| J | 01011010 | 3 |
| K | 00101101 | 3 |
| L | 10010110 | 3 |
| M | 01001011 | 3 |
| N | 01100011 | 2 |
| O | 10110001 | 2 |
| P | 11100001 | 4 |
| Q | 11000011 | 4 |
| R | 11011000 | 2 |
| S | 01101100 | 2 |
| T | 00110110 | 2 |
| U | 10000111 | 4 |
| V | 00001111 | 4 |
| W | 00011110 | 4 |
| X | 00111100 | 4 |
| Y | 01111000 | 4 |
| Z | 11110000 | 4 |

The spectrum class identifies the frequency contribution each contributes to the full spectrum envelope shown in FIG. 3 for the 36 signal sequences.

Where $n=8$, $k=4$ $$A_0=A_2$$
$$A_1=A_3$$

or $$a_0+a_4=a_2+a_6$$
$$a_1+a_5=a_3+a_7$$

The possible groups of equalities are $$\begin{array}{lll} 11 & 1^2 & 1=1 \\ \left.\begin{array}{l}10\\01\end{array}\right\} & 2^2 & 2=4 \\ 00 & 1^2 & 1=\frac{1}{6} \end{array}$$

The possible groups of equalities in the two expressions are $$6^2=36$$

This alphabet of bit sequences is related to the table of code sequences for $n=8$, $k=2$ as will be noted in the following comparison:

The $n=8$, $k=2$ $$a_0+a_2+a_4+a_6=0$$
$$a_1+a_3+a_5+a_7=0$$

The $n=8$, $k=4$ $$a_0+a_4=a_2+a_6$$
$$a_1+a_5=a_3+a_7$$

If $a_2$ and $a_6$ and $a_3$ and $a_7$ are inverted in the first example the bit sequences are translated into the second set of bit sequences.

The first set of bit sequence it will be recalled has a zero frequency spectrum at $f=0$ and $f=½T$ while the second set of bit sequence has a zero frequency spectrum at ¼T and ¾T.

It is thus a feature of this method to permit alphanumeric data occupying a specific portion of the frequency spectrum to be translated into data in another part of the spectrum which permits natural frequency multiplexing.

Figure 4:
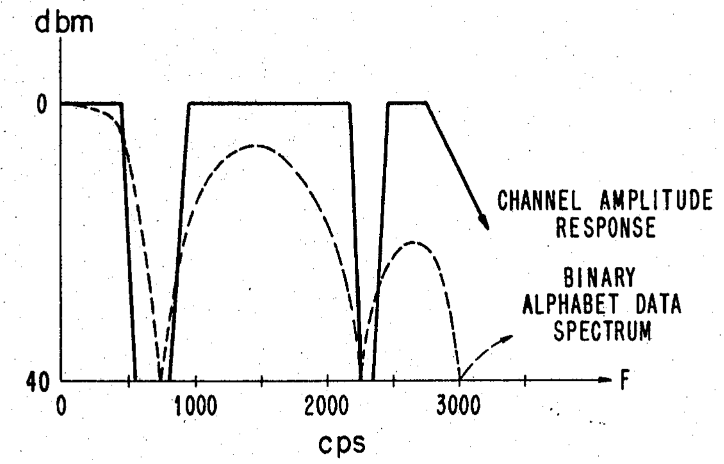
FIG. 4 is the frequency spectrum of a public telephone network.

FIG. 4 as mentioned previously shows that alphabet $n=8$, $k=4$ in conjunction with a frequency spectrum of a United Kingdom Public Telephone Facility.

In the generation of signal sequences it may sometimes be a requirement that the alphabet containing these sequences have maximum contribution at certain points as well as minimum contribution at other points.

EXAMPLE OF MAXIMUM CONTRIBUTION

Suppose $n=8$, $k=4$ $$a_i=\pm 1 \quad \text{(binary alphabet)}$$

and a maximum amplitude contribution is desired whatever the phase may be. The relationship shown in the abstract will read as follows:

$$(a_0-a_2+a_4-a_6)-j(a_1-a_3+a_5-a_7)=C_e{}^{jP}$$

where C is maximum.

This means that the alphabet must be such that $a_0$, $a_2$, $a_4$ and $a_6$ satisfy $a_0-a_2+a_4-a_6=\pm 4$, and that $a_1$, $a_3$, $a_5$ and $a_7$ satisfy $a_1-a_3+a_5-a_8=\pm 4$.

The alphabet therefore consists of 4 characters

| $a_0$ | $a_1$ | $a_2$ | $a_3$ | $a_4$ | $a_5$ | $a_6$ | $a_7$ | Character |
|---|---|---|---|---|---|---|---|---|
| 1 | 1 | 1 | −1 | 1 | 1 | −1 | −1 | 1 |
| 1 | −1 | −1 | 1 | 1 | −1 | −1 | 1 | 2 |
| −1 | 1 | 1 | −1 | −1 | 1 | 1 | −1 | 3 |
| −1 | −1 | 1 | 1 | −1 | −1 | 1 | 1 | 4 |

Since the major interest appears to be in the case of generating alphabets with no frequency contribution at given points in the frequency domain we will henceforth consider only the case where $C=0$.

These alphabets will satisfy zero frequency alphabets at $f=0$, $k=2$.

The invention in its basic conceptual form has been described above and it is intended that that portion of the specification serve to bound the concept rather than the more limited specific examples which follow.

One form of implementation of the described method is obviously to generate the signal sequences with a diode matrix such as shown in FIG. 7 and transfer the same onto the transmission link utilizing a shift register as shown in any of the examples. The generation of the signal sequence could obviously be the result of a key closing such as would be found in any keyboard. Applicant has indicated structural devices which would accomplish this function.

More basic implementations could obviously be a manual key operated to generate marks (+2) and spaces (−1).

More sophisticated implementations of this method employ the basic subcodes and intersperse the same to generate the final sequence of signals. Since the basic subcodes must be interspersed based on the factor $k$, the original data to be transferred can, through a division process based on the number of codes sequences available, select subcodes to yield upon interspersed unique sequences of signals for each data character. These implementations of the method will be described more specifically hereinafter.

For the purpose of explaining the invention in detail, a number of examples will be used in which there is a requirement for a number of bits "$n$" to be used in the data transmission with specified zero contribution points. An unrestricted binary character set, it will be recalled has a zero frequency, contribution at $1/T$, where T is the bit rate. The relationship $1/kT$ is a more general definition of frequency contribution. Thus if $k=2$, there will be a zero frequency contribution at ½T, and at ½T multiples thereof (where the numerator and "$k$" are relatively prime). If $k=3$, there will be zero frequency contribution at ⅓T, ⅔T, 1/T, etc. For $k=4$, the relationship will obviously be ¼T, ¾T, 1/T, etc. (2/4T is excluded because they are not relatively prime).

The higher the lobes of frequency contribution decrease rapidly in importance and it has been demonstrated for example that the frequency contribution from ½T to 1/T is not necessary for information transfer if the energy in this range can be concentrated between 0 and ½T. The case in which $k=2$ is economically very advantageous when considered in terms of the frequency spectrum required for a given bit rate and the extent of the character representations which are possible in an alphabet having this spectral distribution.

In the transmission of signal sequencies utilizing the basic code subgroups, it is a prerequisite that the datum to be transferred first be translated into a unique representation of this datum having no individual digit greater than the number of possible code groups.

This is accomplished by successively dividing the original datum and successive quotients by the number which is the same as the number of code groups and utilizing each remainder as one digit of the unique representation of the datum. The process will be described more specifically with relation to the apparatus used in the synthesizing process.

In FIG. 5A three sources of data are shown, a keyboard 78, a source of speech 84 and a source of telemetry 90. The data is in digital form for purpose of this example, although form of input is of no importance to the inventive concept. Thus the keyboard data could as well be encoded directly as a function of key closure, as will be apparent. The keyboard 78, shown schematically, contains keys which when operated generate a combination of pulses which appear on output 80. Keyboard encoding devices are conventional and varied from switch closing electronic encoding to mechanical interposers with electromechanical sensing arrangements. Details of such apparatus are considered unnecessary.

The digital data from keyboard 78 is transferred to a storage register 82 containing 6 positions of storage. (For the thirty-six possible characters) the register 82 consists of six bistable devices which are set to a first state in response to a raised voltage level ("1"), or set to a second stable state ("0") in response to a reset input 81.

A source of data 84 is designated as digitized speech. It could also be, for example any other type of digital data having a requirement for 216 characters of information. The source of data 84 is coupled to a register 88 containing 8 positions of storage therein.

Similarly a source of data 90 is shown coupled to a register 92 which contains 11 positions of storage to receive this data. The data is designated as telemetry although this is by way of example also.

The frequency of the data input will vary in pulses to the data inputs. For example, one position of the ring 94, output 95, provides an output to AND circuit 100 FIG. 5A to which is coupled the output of the keyboard register 82. It can be seen from inspection that information in the register 88 is sampled three times as fast as the information in register 82 by the fact that three outputs of the ring 94 are coupled through an OR circuit 104 and AND circuit 102 FIG. 5A to sample the contents of the register 88 at these three instants of time.

Figure 5B:
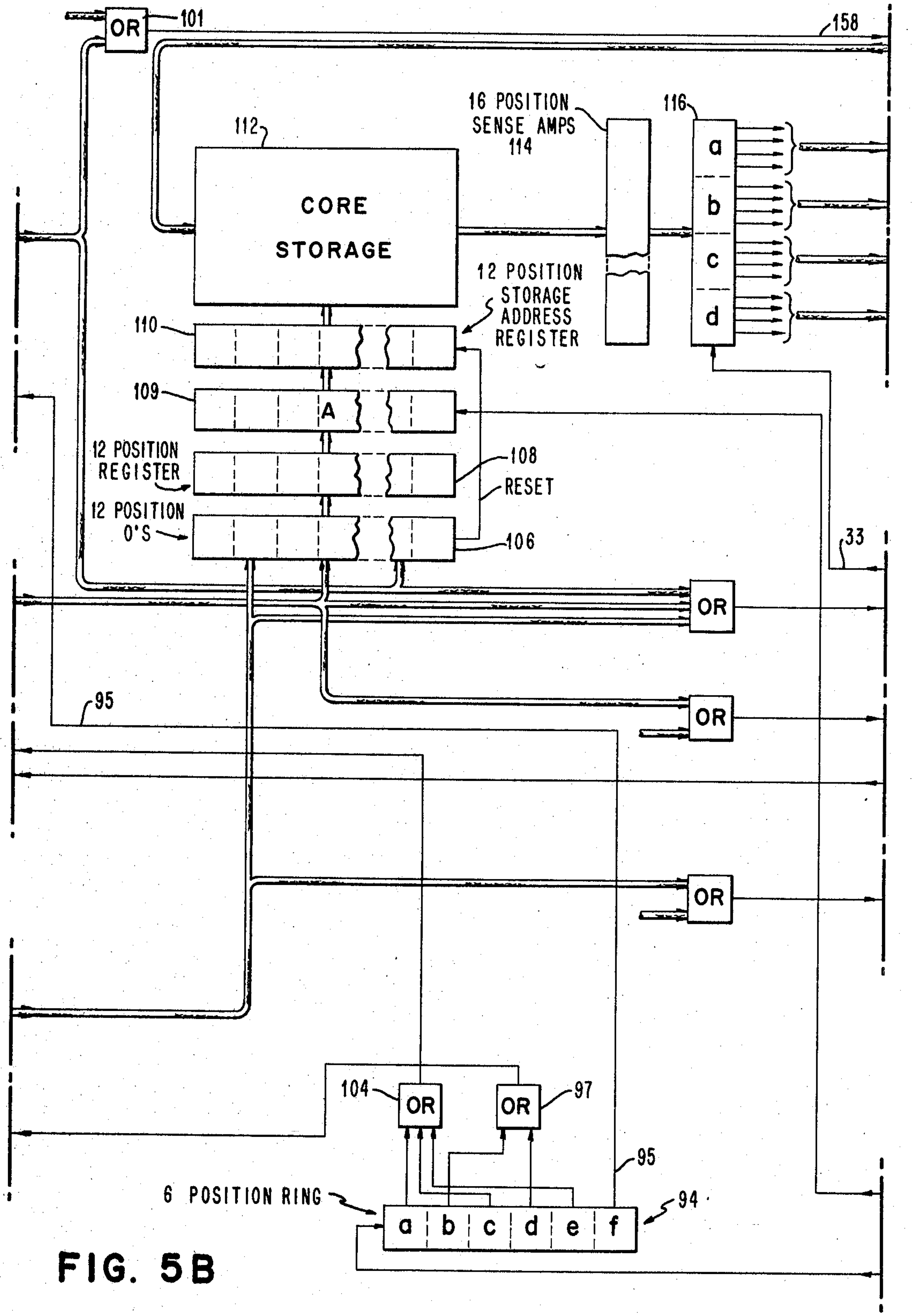
Figure 5C:
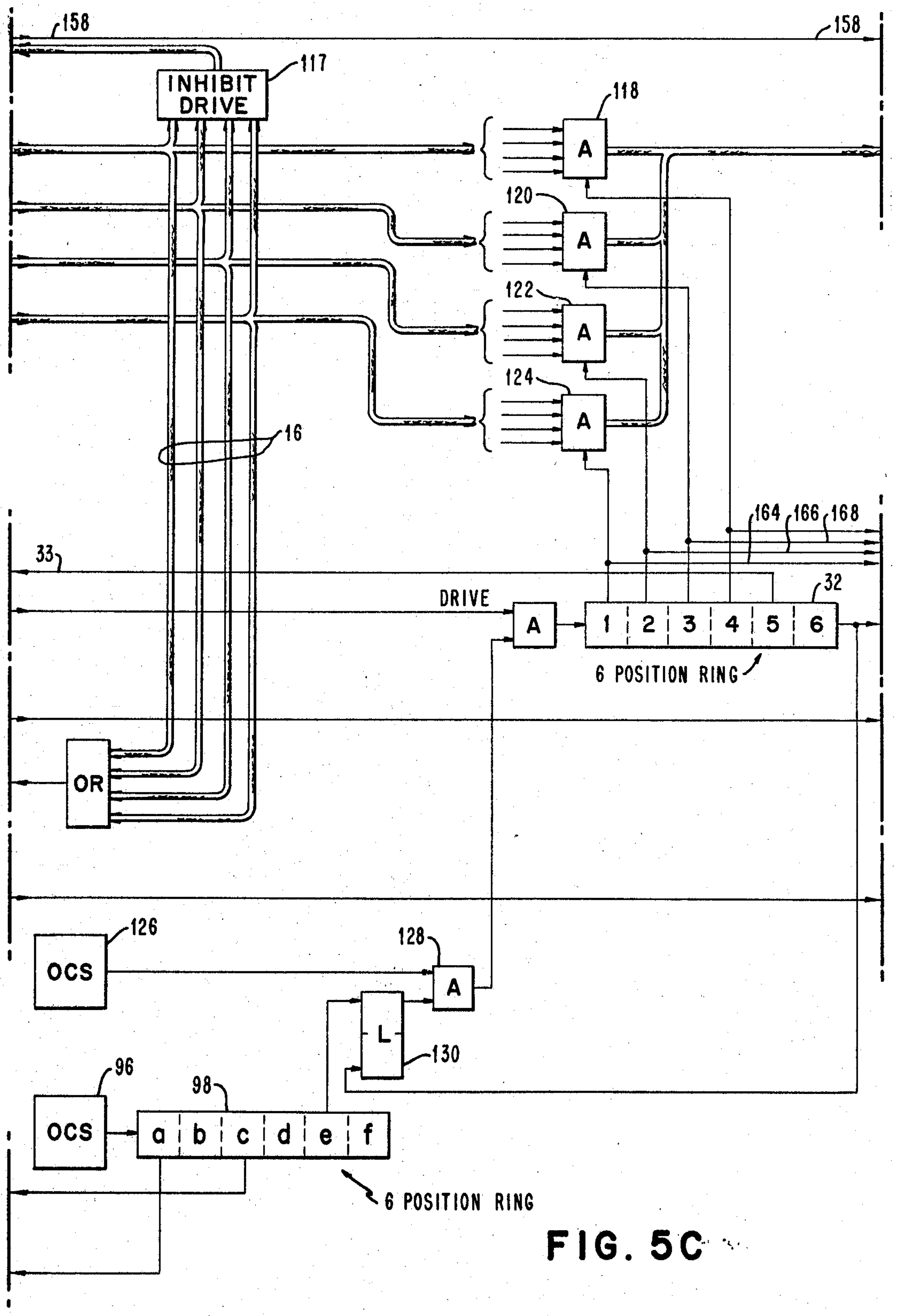

The ring circuit 94, FIG. 5B is conventional in form and consists of a number of stages which are turned ON and OFF successively. The ring is closed to enable the last stage to turn on the first stage. The output from AND circuit 100 connected to register 82 is transferred through OR circuits 106 to a register 108, FIG. 5B. At "*c*" time, ring 98, FIG. 5C the contents of register 108 are read into a storage address register 110. At "*e*" time, ring 98, FIG. 5C a pulse is applied to a bistable storage device 130 FIG. 5C to initiate the operation of a ring 32 which controls the synthesizing of a data character based on the number stored in register 116, FIG. 5B. The ring circuit 98 is driven by oscillator 96 having a frequency sufficient to accomplish the required sampling. Ring 98 sequentially and successively provides six time pulses. A pulse from stage **98*a* is coupled to the ring circuit 94. This connection provides for stepping the ring 94 one position for each six counts of the ring 98. The basic timing circuit for the apparatus shown is oscillator 96 and ring circuit 98**.

The data register 108, FIG. 5B forms a part of a dividing circuit which in the apparatus shown is a magnetic core storage of conventional configuration and operation. The data in register 108 is the address of a character position in core storage and this address is transferred through AND circuits 109 to a register 110 at "*c*" time of ring 98 to initiate the reading of the character at that location through sense amplifiers 114 into a register 116. The data in register 116 is restored to core storage 112 through inhibit drivers 117 during the write cycle of this storage array. The details of registers, timing and inhibit drivers are well known in the art and details of timing for read and write cycles are omitted, see for example U.S. Patent No. 2,939,120 to E. Estreems.

The dividing apparatus translates incoming digital data into digital data having no digit greater than six. The storage array is merely an illustrative apparatus in this respect. More mechanistic dividing apparatuses are obviously available to perform a dividing function. However for this operation a core storage containing tables of remainders for all possible numbers will illustrate a step in the synthesizing of an alphabet.

In essence, the storage 112 contains at each addressable storage location 16 bits of data which are referrable to the address which is stored in register 108. To be more specific a number 25 in register 108 from keyboard 78 will be referrable to a location in core storage. At this location will be stored a number 0014.

$$\overset{4}{6\sqrt{25}}-1$$

$$\overset{0}{6\sqrt{4}}-4$$

For a data character 138, there will be in storage location 138 a number 053.

$$\overset{23}{6\sqrt{138}}-0$$

$$\overset{3}{6\sqrt{23}}-5$$

$$\overset{0}{6\sqrt{3}}-3$$

For a data character 762, there will be in storage location 762 a number 0133.

$$\overset{127}{7\sqrt{762}}-0$$

$$\overset{21}{6\sqrt{127}}-1$$

$$\overset{3}{6\sqrt{21}}-3$$

$$\overset{0}{6\sqrt{3}}-3$$

It should be noted that the discussion is here based on decimal while in the storage the same would be binary (as illustrated).

The register 116, FIG. 5B consists of 16 positions of storage divided down into four, four denominational units with each unit consisting of a number from 0 through 5 for the purpose as indicated previously. The digital data in the register 116 is coupled to AND circuits 118, 120, 122 and 124, FIG. 5C. There are four AND circuits in each AND box 118, 120 etc. The enabling input shown at the bottom of the boxes is applied simultaneously to all AND's. At time "*e*" of ring 98 a latch 130 is set to supply an input to AND 128 to which is coupled an oscillator 126 which in turn drives a counter 32 to scan the data from register 116. The latch 130 is reset at time "6" of ring 32 to remove the drive from the ring 32. At this time also the register 116 is also reset through connection 33.

Figure 5D:
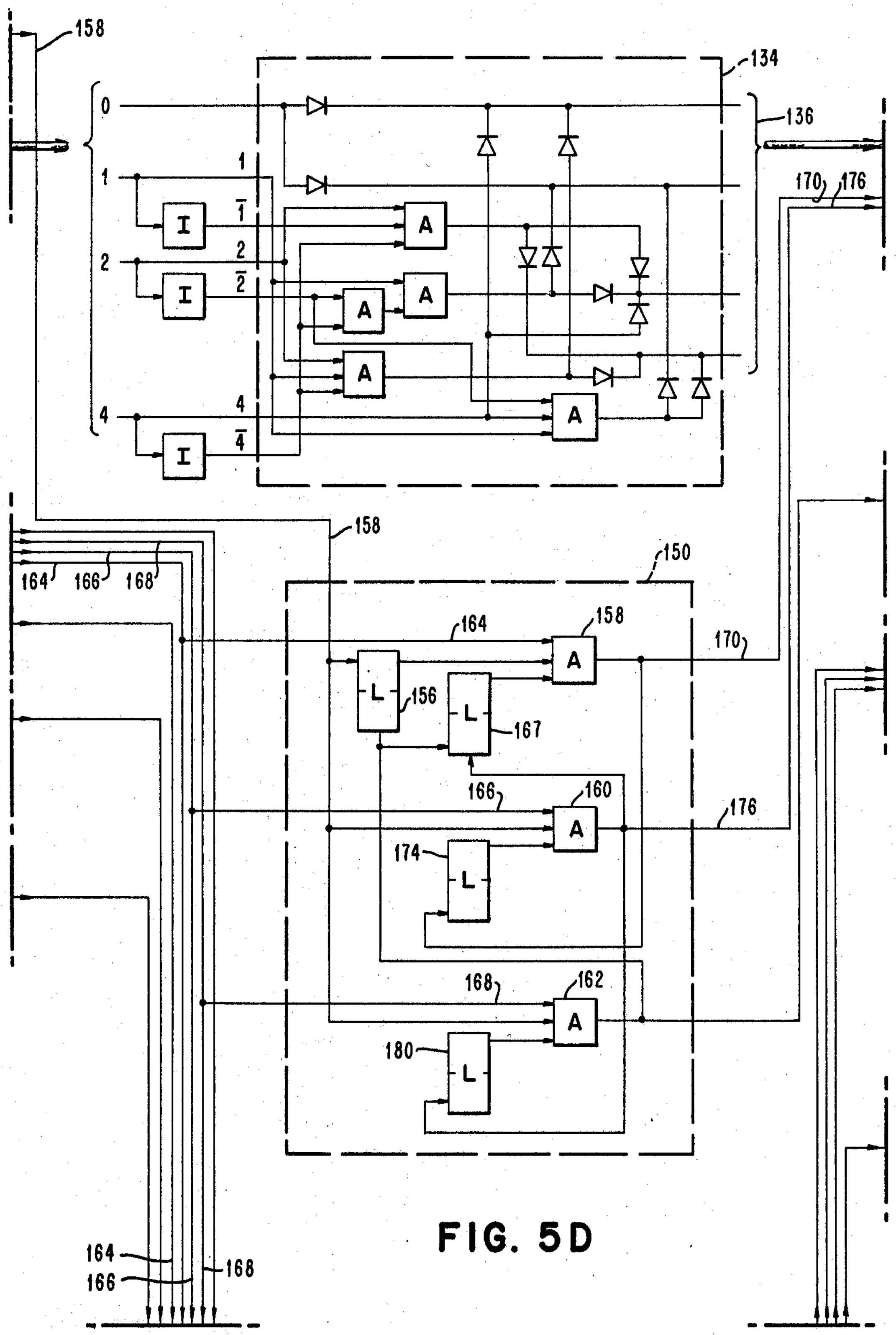

The information from each of the four bit storage sections of register 116 is coupled sequentially to a translator 134, FIG. 5D (shown herein as a diode type), to generate the following set of sequences.

| | Input | Output |
|---|---|---|
| For "0" | (1000) | 1100 |
| For "1" | (0100) | 0110 |
| For "2" | (0010) | 0011 |
| For "3" | (0110) | 1001 |
| For "4" | (0001) | 1010 |
| For "5" | (0101) | 0101 |

The diode translator 134 consists of the appropriate connections to enable the input of a digit consisting of the above binary digits to select output lines 136 to achieve the particular code combination required. The translator 134 is conventional and forms no specific inventive feature except that it or another type is required to give the specific code combination desired.

The output 136, FIG. 5D of translater 134 is coupled to a series of registers 138, 140 and 142. Register 138 is and 8-position register, 140 is a 12-position register and register 142 contains 16 positions of storage. Register 138 is specifically designed to transmit data from a data source such as a keyboard 78 and in effect contains 8 bits of data as opposed to the original 6 bits. To effect the synthesizing of a data character from keyboard 78 it is necessary to select the register 138 in response to the data input being coupled through the storage. This is accomplished by means of an output from AND 100, FIG. 5A and OR 101, FIG. 5B, which detects the presence of data from the keyboard being presented for translation. This output sets a latch 156 in a selective, interspersing unit 150, FIG. 5D to be subsequently described.

Figure 5E:
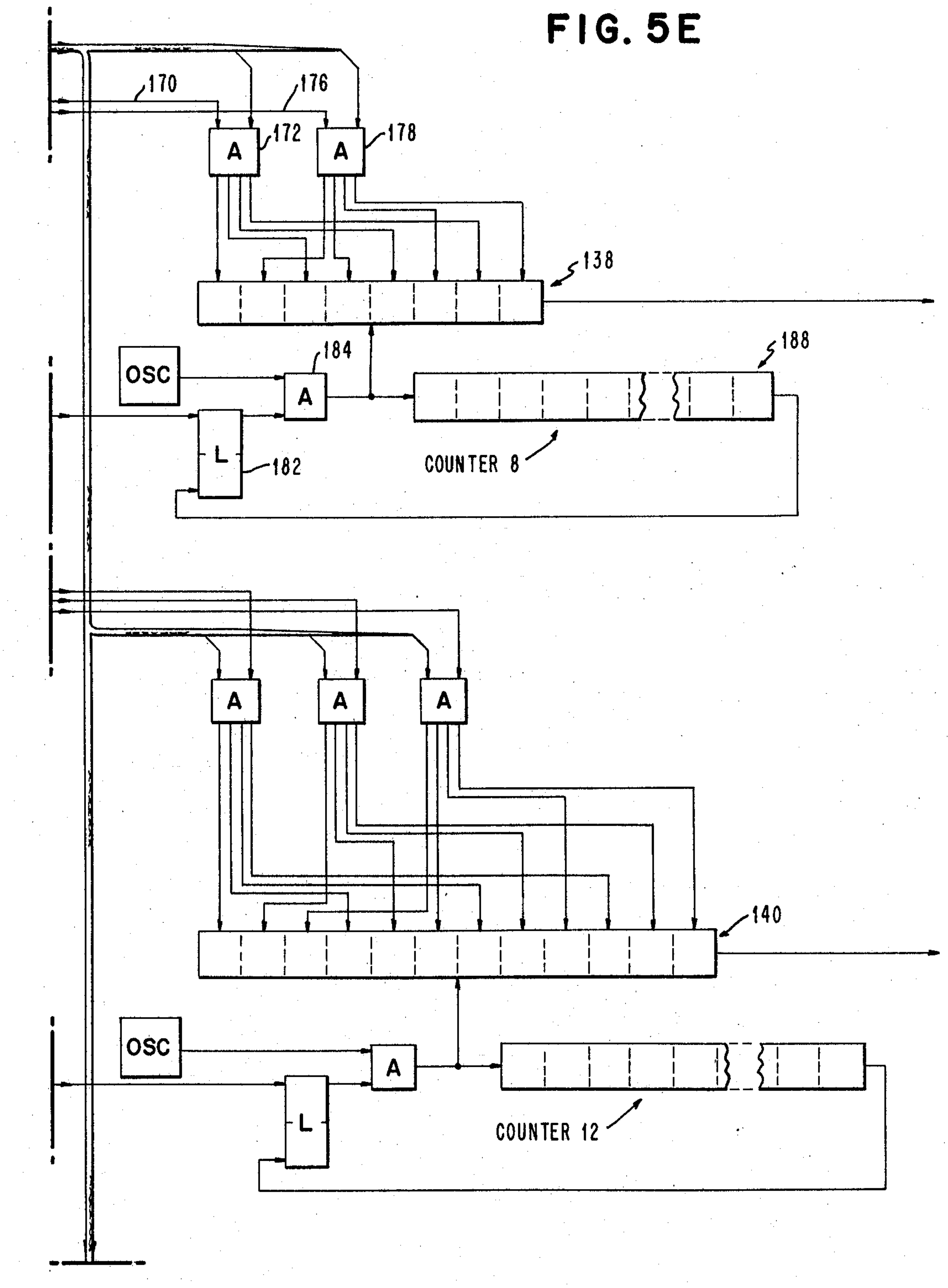
Figure 5F:
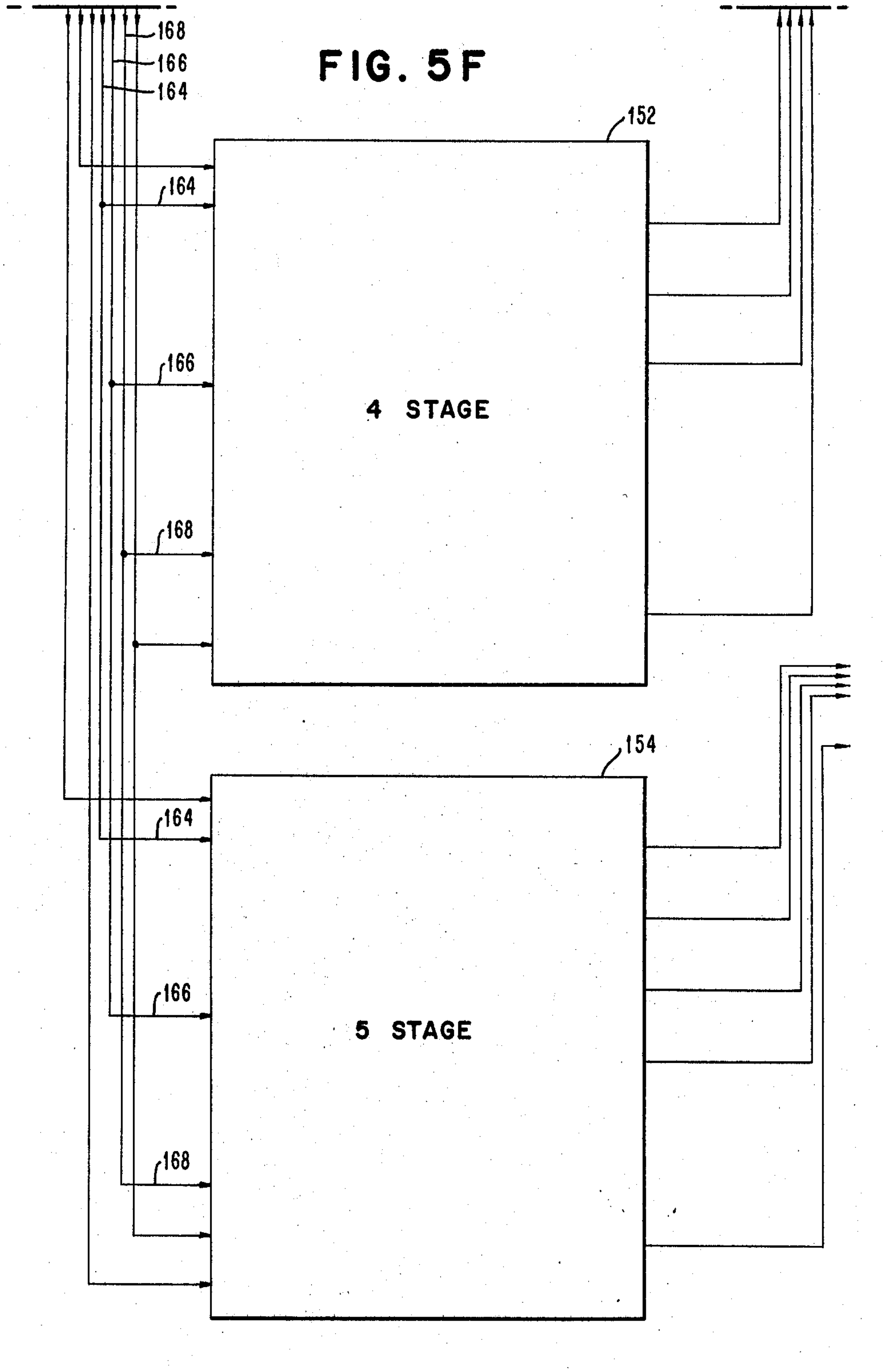
Figure 5G:
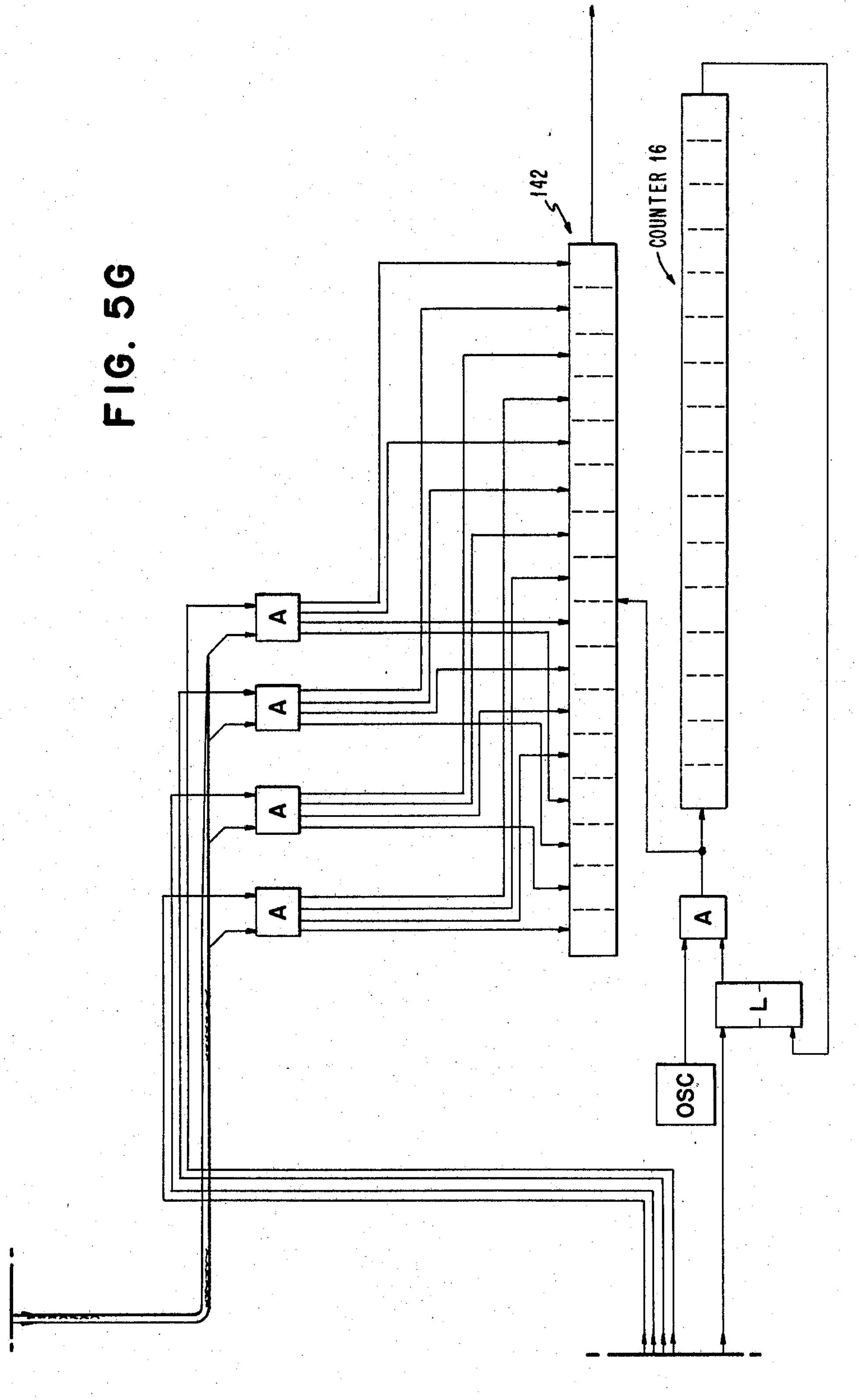

The shift register 138, 140 and 142, FIG. 5E, FIG. 5G are the type in which data may be entered into the stages in parallel and shifted therefrom serially to an output transmission line. This type of shift register is conventional see, for example, U.S. Patent 2,988,701 to G. L. Clapper.

Selection interspersing unit 150, FIG. 5D, consists of a latch 156 which is set by a signal on line 158 from AND circuit 100, FIG. 5A, indicative that data from the keyboard is being presented. The output of latch 156 conditions a series of AND circuits 158, 160 and 162. A timing signal at input 164, 166 and 168 is obtained from the timing ring 32 used to sample the register 116. The latch 167 is ON prior to a selection-interspersing operation (being reset to this condition after a previous operation). The AND circuit 158 will be enabled by the two timing signals to conditioned AND circuits 172, FIG. 5E. With data being available on outputs 136, the selection of AND circuits within AND 172, FIG. 5E, by the output of AND 158 will set alternate stages of register 138.

On the timing pulse 32, output 166, the latch 174 is set by the output 170 being applied to the set side of this same latch. The latch 174 conditions an AND circuit 160 so that on the next timing pulse 32(2), output 16E the output of AND 160 is coupled to AND 178, FIG. 5E. The output from translator 134 for the next digit set in **116*b* is thus set into the alternate digit positions of register 138**.

The output of AND circuit 160 further sets a latch 180 which the AND circuit 162 and a timing signal at 168, 32(3) sets a latch 182 in the ring circuit 138, resets latch 174 and sets the latch 167 to initialized conditions. It will be noted that the timing signal from line 168 is not utilized in the transfer of information into the shift register 138 since the 8 bits of data require only 8 register positions.

When the latch 182 in the ring circuit is set, the output thereof conditions AND circuit 184 to which is coupled an oscillator which drives a counter 188 and at the same time provides a series of shift pulses to the shift register 138 to serially read the information contained therein, therefrom. After 8 pulses from the counter 188 the output is applied to latch 182 to reset the same and initialize this device for the next translated data.

The synthesizing of data from source 84 and 90 is performed similarly. The difference being that each contains more coded groups to be interspersed. Similarly selection, interspersing units 152 and 154, FIG. 5F contain additional stages to control interspersing of a greater number of control groups.

One of the natural utilizations of applicant's method would be in multiplexing of data from multiple sources. As described hereinbefore, the subcodes for any given "$k$" are interspersed to form the final signal sequence for transmission, where the signal sequence is representative of any a given datum. It is contemplated that it may be an efficient utilization to employ subcodes as indicative of unique datums while interspersing these subcodes to obtain the final signal sequence.

It may be required that data be transmitted containing "$n$" bits where $n$ is not a multiple of $2k$. In this instance it is necessary to invert every second character or every third and fourth character to achieve the required results.

For example:

$$n=15$$
$$m=2$$
$$k=3$$

In the formation of this alphabet, the following relationship must be satisfied:

$$A_0=A_1=A_2=0$$

In terms of the five digits code groups:

$$a_0+a_3+a_6+a_9+a_{12}=a_1+a_4+a_7+a_{10}+a_{13}=a_2+a_5+a_8+a_{11}+a_{14}=0$$

It is necessary that every other character be inverted in order to satisfy the relationship above. Where the code groups are equal to zero, it must be over two characters or 6 code groups to permit the "1's" and "0's" of a five unit group to be equal.

A five digit code group of the form 11100 (or 11000) is inverted in successive characters. The basic code group is here shown as (11100, etc).

| | |
|---|---|
| 0–11100 | 5–10101 |
| 9–11010 | 6–10011 |
| 7–10110 | 2–01011 |
| 4–01110 | 1–00111 |
| 8–11001 | 3–01101 |

For 11000 there are the same combinations with "0" and "1" interchanged. The number of characters in an alphabet of 15 bits with $k=3$ are thus $10^3=1000$.

The synthesizing of this transmisison alphabet can be accomplished by apparatus such as shown in FIG. 6. It is in general, quite similar to the apparatus for synthesizing the 8, 12 and 16 bit alphabets where $k=2$, 3, and 4, respectively.

In this instance there are 1000 characters in the 15 bit alphabet and in the input this can be represented in binary by 10 binary bits.

$$2^{10}=1024$$

The character to be encoded is received in a register 200 having 10 positions of storage. The number represented by these ten binary bits is divided into component parts $$C=C_0+C_1 10+C_2 10^2$$

by a dividing circuit which can be of any configuration including a storage array for the storage of remainders C which are read therefrom in response to an address which is the character to be translated. The circuit 202 while shown generally can be of a configuration as shown in FIG. 5.

An output register 204 for storage dividing circuit 202 receives the data from the address locations. The register contains 12 bistable storage devices which are referrable to three decimal digits (which require 4 binary digits). A clock circuit 206 is shown for driving the dividing circuit 202 to read information from circuit 202 to register 204 at a time $t_1$. At a time $t_2$, an output from circuit 206 initiates operation of a clock 208 which in a manner which is the same as FIG. 5, gates the 3 groups of four binary digits through AND circuits 209, through a translation circuit 210, through AND circuits 212 to the fifteen stage shift register 214.

The translator 210 accepts four digits on each time pulse from clock 208 and transfers the translated output of circuit 210 to the five positions in register 214 separated from one another by two bits.

At time $t_3$ of clock 206, an output initiates operation of a clock 216 which shifts the data in register 214 serially therefrom. The output of register 214 is coupled to AND circuits 218 and 220. The output of 218 is through an OR circuit 222 to the transmission line. The output of 220 is through an inverter 224.

The enabling and disabling of AND circuits 218 or 220 is controlled through a bistable device 226 which is set to the opposite states each time the clock 206 is operated, upon detection of data in register 200. The clock 206 is constructed in the same manner as clock 32 of FIG. 5 and resets itself after each cycle. The input to flip-flop 226 is from the output of a latch in clock circuit 206 such as 130 of FIG. 5.

The translator 210 is of the diode type and take the input of binary (1, 2, 4, 8) and converts the same to the 5 line output. The translator in detail is shown in FIG. 7 and as will be noted constructed to generate the required output.

If there is a requirement for an alphabet of 12 bits $n=12$ with $k=4$ with the presence of D.C. the relationship will be satisfied by:

$$A_0=A_2$$

$$A_1=A_3$$

where $$a_0+a_4+a_8=a_2+a_6+a_{10}$$

$$a_1+a_5+a_9=a_3+a_7+a_{11}$$

The possible equalities are:

000—1
011—3
110—3
111—1

$A_0=A_2$ (011), $3^2=9$
$A_1=A_3$ (011), $3^2=9$
$A_0=A_2$ (001), $3^2=9$
$A_1=A_3$ (001), $3^2=9$

Since $A_0$, $A_2$ and $A_1$, $A_3$ are independent but are used to form the alphabet there are with (001)—

$9^2=81$ combination and with 011

$9^2=81$ combination 000 and 111 give two additional characters which may be used. The code combinations are therefore:

(1) 110
(2) 101
(3) 011
(4) 001
(5) 010
(6) 110

It will be noted that 1–3 and 4–6 are the same combinations with the "1" and "0" interchanged.

The basic groups are:

| | |
|---|---|
| 110 | 001 |
| 101 | 010 |
| 011 | 100 |

The input character to be translated must include no digit greater than 2 (0, 1, 2) in order to selectively generate four code groups in order to form the 12 digit output with $k=4$. However, there are two sets of three code groups in order to obtain 162 combinations $$(3\times3\times3\times3\times2)$$

The selectivity of one code group or another can thus be made to depend on one remainder as follows:

For numbers smaller than 81, for example:

Remainder $\overset{26}{3\sqrt{80}}$-----2

$\overset{8}{3\sqrt{26}}$-----2

$\overset{2}{3\sqrt{8}}$-----2

$\overset{0}{3\sqrt{2}}$-----2

For numbers larger than 81, for example:

Remainder $\overset{27}{3\sqrt{83}}$-----2

$\overset{9}{3\sqrt{27}}$-----0

$\overset{3}{3\sqrt{9}}$-----0

$\overset{1}{3\sqrt{3}}$-----0

$3\sqrt{1}$-----1

By dividing the data to be transferred by three and successive quotients and using the remainder as the unique presentation for selecting the transmission code for synthesizing into a data character it is found that the fifth remainder is a zero or one where the original number is less than 162. The last remainder can thus be used to select whether the data character will be transmitted in four-bit subgroups of the type ("110" or "001," for example).

The apparatus shown in FIG. 8 is illustrative of an arrangement for accomplishing the above explained method.

A register 300 contains eight bistable devices for the reception of up to 164 characters (the character set for the above alphabet). When the character is received an output from the register 300 is detected by an OR circuit 302 to set a latch 304 and supply an input to AND 306 to enable the same to pass the output from an oscillator 308 to a ring circuit 310 used for timing. The ring circuit 310 supplies output 312 to reset latch 300 and output 314 to reset the input register 300. The ring is closed so that upon reapplication of an enabling input, the ring is driven again through a timing cycle.

At time $t_0$, the data in register 300 is gated into a dividing circuit 320 which provides an output of fifteen bits (5 denominational units of 3 bits each) to a register 322. The 15 bits represent the five digits which are the remainders from successive division by three. The three output lines shown could for example represent 0, 1 or 2 when a raised output is presented. The three bistable devices 322*e* are utilized to distinguish between number 0–81 and 82–162. In this instance a "1" bit is used to signal that the number is 82 or greater.

The digits stored in register 322 are read therefrom through AND circuits 324 in response to the output of the timing ring 310 having applied thereto the timing pulses $t_1$–$t_4$. Pulse $t_5$ is utilized in conjunction with AND circuit 326. The output of register 328 is supplied through a translator 328 which translates.

bit 0—011
bit 1—101
bit 2—011

The output of translator 328 is supplied to multiple AND circuits 330, 332, 334, and 336. Timing pulses from ring 310 are shown applied to each group of AND circuits to gate successive code groups into a shift register 338. The register 338 receives data bits in parallel and shifts them out serially. As shown AND circuit 330 inserts data bits (or not) into positions, $$a_0, a_4, a_8$$

AND's 332, 334 and 336 intersperse successive groups in order to complete the synthesizing process.

At time $t^5$ of ring 310, and AND circuit 326 is enabled. If there is a "1" bit, signifying a digit 82 or above, an output from AND circuit 326 sets a latch 340. The output of latch 340 on line 342 conditions AND 344 and disables an AND 346. The output of shift register 338 would therefore be transferred through AND 344 and an OR 348 to a transmission line 350. If there is no "1"

bit stored in register 322*e*, the latch 340 will not be set, AND circuit 346 will be enabled and the output of register 338 will be transferred through AND 346 and an inverter 352 to provide an inverted output of 350.

At time $t_6$, a latch 354 is set to enable an AND 356 and permits an oscillator 358 to drive a ring 360 which shifts the contents of register 338 serially therefrom. At position 13, an output resets latch 354 preparatory for the next cycle of operation. The ring 360 is closed and the reset position of this ring is stage 14.

The dividing circuit 320 can be of any type including the core storage suggested for previous synthesizing.

It is a part of this synthesizing process to generate alphabets having more than two level, i.e., binary. It may be required that alphabets be generated having for example three levels, $m=3$. If the number of bits $n=7$ and $k=2$ and a zero is required at $f_0$ the alphabet will be composed of groups.

$$A_0=a_0+a_2+a_4+a_6$$

and $$A_1=a_1, a_3, a_5$$

With $A_0=A_1=0$ and bit values of $+1$, $-1$ and 0 the equalities will be those code groups having equal numbers of $+1$ and $-1$. For the four bit code groups this will include:

| | |
|---|---|
| 100–1 | 0–110 |
| 0–101 | 01–10 |
| 010–1 | 1–11–1 |
| 00–11 | –11–11 |
| 001–1 | –111–1 |
| –10+10 | 1–1–11 |
| 10–10 | 11–1–1 |
| 1–100 | 0000 |
| –1100 | –1–111 |
| –1001 | |

In the three bit code groups there will be:

01–1
0–11
10–1
–101
1–10
–110
000

For each data character to be synthesized there will be one code group of four and one code group of three interspersed to form the final data charatcer.

With 19 code groups of four bits and 7 code groups of three bits, it is possible to form $7\times19=133$ characters.

The form of the apparatus could be for example a division circuit for dividing by 7 to extract the quotient and remainder in order to select two code groups to form the unique character combination as indicated for other examples. However, in this instance it is possible to use a dividing circuit such as illustrated in the preceding figures to generate directly the code groups required.

Utilizing a core storage of 14 bits it is obviously possible to utilize eight bits to designate the $+1$, $-1$ combinations in the four bit code group and six bits to designate the $+1$, $-1$ combinations for the 3 bit code group. The "0" combination are evidenced by the absence of an output from other bit position.

Thus in FIG. 9, a register 380 containing eight bit positions is shown to enable the reception of 133 characters. A dividing encoding circuit 382 is shown of the same type as described for preceding figures except that the character positions to which each incoming character is referrable contain the encoded data for both the four and three bit code group for that character already interspersed. Thus the core storage addressing arrangement in this synthesizing process act to divide the number into its component part and select the code group simultaneously. The register 384 thereupon receives fourteen bits which are encoded for the seven bit positions (3 level) to be transmitted

00=0
01=−1
10=+1

The data bits are gated by twos through AND circuit 386 timed by an appropriate timing source to summing resistors 393, 394 which provide three levels of voltage to the transistor drivers 395, 396. The transistors 395 and 396 supply respectively positive pulses and negative pulses or in these cases where the signal is indicative of "0," a ground level output.

The data transmitted in the signal sequence form suited to the transmission link is translated back into the required form at the receiver by any suitable translating apparatus. A very flexible translator suitable for translating is shown in U.S. Patent No. 3,268,875 to W. S. Schaffer. It is of course obvious that in those instances where no translation is needed, no translating apparatus would be employed.

The invention has been described most specifically in relation to the most generic case of applying sequences of electrical signals to a transmission line to obtain a frequency spectrum of the signal sequence on the transmission line which is most compatible with the frequency constraints of the transmission line.

One inherent feature of this method is the ability to utilize individual sequences of signals, in the alphabet of signals necessary for some data source preferentially in accordance with their individual spectral contribution and their rate of occurrence as determined by the datum.

As will be noted in FIG. 3, and in the description of the alphabet on which this figure is based, there are classes of signal sequences and in the chart is listed adjacent these sequences an allocation of a sequence to a particular datum.

The spectral contribution of each signal sequence is determined by testing the sequence for any given $1/kT$ in accordance with the method set forth hereinbefore.

By assigning sequences of signals to specific characters it is of course possible to achieve maximum reliability in transmission for more important characters.

Mentioned previously in the specification is the ability to utilize multiple data sources each utilizing a subalphabet for its individual data and then interspersing the subalphabet to form the final signal sequence.

Inherent also in the described method is the ability to generate a sequence of signals in which the factor "*k*" has multiple values. This is achieved by utilizing the sequences of signals which are common to the alphabets determined for the individual "*k*."

What is claimed is:

1. A method for optimizing the transfer of data over a transmission link having frequency constaints by utilizing a sequence $$\alpha=(a_0, a_1, a_2 \ldots a_{n-1})$$

of *n* signals having a predetermined frequency spectrum at frequency points $1/kT$ and multiples thereof (where the numerator and *k* are relatively prime) where T is the signal element duration and *k* is a constant (1, 2, 3, etc.), which comprises:

(a) generating at least a single sequence of signals for each datum to be transferred in accordance with the relationship $$K(kT)\sum_{i=0}^{i=n-1} a_i e^{\frac{-j2\pi i}{k}}=C_k e^{-jP_k}$$

which defines the frequency contribution of the data at $1/kT$ where:

(1) $a_i$ are "*n*" signals, $a_0, a_1, a_2 \ldots a_{n-1}$ in said sequence represented by a logical +1 or a logical −1, (2) $K(kT)=\frac{1-\exp(-j2\pi fT)}{j4\pi^2 f}$, exp=e, (3) $f=1/kT$ is the point of frequency constraint being considered (and multiples thereof where the numerator and $k$ are relatively prime), (4) $C_k$ is a constant which takes discrete values going from 0 to some maximum and fixing the amplitude frequency contribution at points $1/kT$, (5) $P_k$ is a constant angle which also takes some discrete value going from 0 to $2\pi$ and fixing the phase frequency contribution (compatible with the amplitude) at points $1/kT$, (b) applying said sequence of signals to said transmission link.

2. A method for optimizing the transfer of data over a transmission link having frequency constraints by utilizing a sequence.

$$\alpha=(a_0, a_1, a_2 \ldots a_{n-1})$$

of $n$ signals having a predetermined frequency spectrum at frequency points $1/kT$ and multiples thereof (where the numerator and $k$ are relatively prime) where T is the signal element duration and $k$ is a constant (1, 2, 3, etc.), which comprises:

(a) generating at least a single sequence of signals for each datum to be transferred in accordance with the relationship $$\sum_{i=0}^{i=n-1} a_i e^{\frac{-j2\pi i}{k}}=0$$

where $a_i$ are the signal elements in said sequences where each $a_i$ is multilevel signal element ($m$ element), (b) applying said sequences of signals to said transmission link.

3. A method for optimizing the transfer of data over a transmission link having frequency constraints by utilizing a sequence $\alpha=(a_0, a_1, a_2 \ldots a_{n-1})$ of "$n$" multilevel signal elements having a frequency spectrum with substantially zero frequency contribution at frequency points $1/kT$ (and multiples thereof, where numerator and $k$ are relatively prime) where T is the signal element duration and $k$ is a prime constant (1, 2, 3, 5, etc.), and a submultiple of "$n$" which comprises:

(a) generating a subcode of a sequence of signals $$\alpha_j=(a_j, a_{j+k}, a_{j+2k} \ldots a_{j+n-k}$$

for $j=0, 1, \ldots k-1$, where $A_j$ is value of the arithmetic sum of the subcodes elements $$A_j=a_j+a_{j+k} \ldots a_{j+n-k}$$

for $j=0, 1, \ldots k-1$, and $A_0$, $A_1$, etc., are the sum of like signals for $j=0, 1, k-1$, such that:

$$A_0=A_1= \ldots A_{k-1}$$

(b) interspersing said sequences of signals (a) to form said final signals sequence $\alpha=(a_0, a_1, a_2 \ldots a_{n-1})$; and c) applying said final signal sequence to said transmission link.

4. A method for optimizing the transfer of data over a transmission link having frequency constraints by utilizing a sequence $\alpha=(a_0, a_1, a_2 \ldots a_{n-1})$ of "$n$" multilevel signal elements having a frequency spectrum with substantially zero frequency contribution at frequency points $1/kT$ (and multiples thereof, where numerator and $k$ are relatively prime) where T is the signal element duration and $k$ is not a prime number ($k=c\cdot d$) and is a submultiple of "$n$" which comprises:

(a) generating a subcode of sequences of signals $$\alpha_j=(a_j, a_{j+k}, a_{j+2k} \ldots a_{j+n-k})$$

for $j=0, 1, \ldots k-1$, where $A_j$ is the value of the arithmetic sum total of the subcode elements $$A_j=a_j+a_{j+k} \ldots a_{j+n-k}$$

for $j=0, 1, \ldots k-1$, and $A_0$, $A_1$, etc., are the sum like signals for $j=0, 1, k-1$, such that:

$$A_0=A_c=A_{2c}= \ldots A_{(d-1)c}$$

$$A_1=A_{c+1}=A_{2c+1}= \ldots A_{(d-1)c+1}$$

$$\vdots$$

$$A_{c-1}=A_{2c-1}=A_{3c-1}= \ldots A_{k-1}$$

for any pair $c\cdot d$ which satisfy $k$;

(b) interspersing said sequences of signals to form said final signal sequence $\alpha=a_0, a_1, a_2 \ldots a_{n-1}$, and (c) applying said final signal sequence to said transmission link.

5. A method of optimizing the transfer of data over a transmission link having frequency constraints by utilizing a sequence $\alpha=a_0, a_1, a_2 \ldots a_{n-1}$ of "$n$" multilevel signal elements having a frequency spectrum with substantially zero frequency contribution at frequency points $1/kT$ (and multiples thereof, where numerator and $k$ are relatively prime) where T is the signal element duration and $k$ is a prime number (1, 2, 3, 5, etc.), but is not a submultiple of "$n$" which comprises:

(a) generating a subcode of a sequence of signals:

$$\alpha'_j=a_j, a_{j+k}, a_{j+2k} \ldots a_{j+n'-k}$$

for $j=0, 1, \ldots k-1$, where $A'_j$ is the value of the arithmetic sum of the enlarged sequence of signals $$A'_j=a_j+a_{j+k}+a_{j+2k} \ldots a_{j+n'-k}$$

for $j=0, 1, \ldots k-1$, and $A_0'$, $A_1'$ are the sum of like signals for $j=0, 1, \ldots k-1$, where $n'$ is the number of signals in a sequence $n\cdot k$ and said signal sequence is: $\alpha(n')=(a_0, a_1, a_2 \ldots a_{n-1}, a_n, a_{n+1} \ldots a_{2n-1}, a_{2n}, a_{2n+1} \ldots a_{3n+1} \ldots a_{nk-1}$, such that $A'_0=A'_1=A'_2=A'_{k-1}$;

(b) interspersing said subcodes to form said signal sequence $\alpha'(n)$;

(c) applying said signal sequence to said transmission link.

6. A method for optimizing the transfer of data over a transmission link having frequency constraints by utilizing a sequence $\alpha=a_0, a_1, a_2 \ldots a_{n-1}$ of "$n$" multilevel signal elements having a frequency spectrum with substantially zero frequency contribution at frequency points $1/kT$ (and multiples thereof, where numerator and $k$ are relatively prime) and at $f=0$ where T is the signal element duration and $k$ is a prime constant (1, 2, 3, 5, etc.), and a submultiple of "$n$" which comprises:

(a) generating a subcode of a sequence of signals $$\alpha_j=a_j, a_{j+k}, a_{j+2k} \ldots a_{j+n-k}$$

for $j=0, 1, \ldots k-1$, where $A_j$ is the value of the arithmetic sum of the subcode elements $$A_j=a_j+a_{j+k} \ldots a_{j+n-k}$$

for $j=0, 1, 2, \ldots k-1$, and $A_0$, $A_1$, etc., are the sum of like signals for $j=0, 1, k-1$, such that: $A_0=A_1 \ldots A_{k-1}=0$;

(b) interspersing said sequences of signals to form said final signal sequence $\alpha=(a_0, a_1, a_2 \ldots a_{n-1})$; and (c) applying said final signal sequence to said transmission link.

7. A method for optimizing the transfer of data over a transmission link having frequency constraints by utilizing a sequence $\alpha=(a_0, a_1, a_2 \ldots a_{n-1})$ of "$n$" multilevel signal elements having a frequency spectrum with substantially zero frequency contribution at frequency points $1/kT$ (and multiples thereof, where numerator and $k$ are relatively prime) and at $f=0$ where T is the signal element duration and $k$ is a prime number (1, 2, 3, 5, etc.), and a submultiple of $n$ and $2k$ is not a submultiple of $n$ which comprises:

(a) generating a subcode of sequences of signals $$\alpha_j=a_j, a_{j+k}, a_j+2_k \ldots a_{j+n-k}$$

for $j=0, 1, \ldots k-1$, where $A_j$ is the value of the arithmetic sum of the subcode elements $$A_j=a_j+a_{j+k} \ldots a_{j+n-k}$$

for $j=0, 1, 2, \ldots k-1$, and $A_0$, $A_1$, etc., are the sum of like signals for $j=0, 1, k-1$, such that: $A_0=A_1= \ldots A_{k-1}$;

(b) interspersing said sequences of signals to form said final signal sequences $\alpha=(a_0, a_1, a_2, \ldots a_{n-1})$;

(c) inverting alternate signal sequences such that $A_0=A_1= \ldots A_{k-1}=0$;

(d) applying said signal sequences to said transmission link.

8. A method for optimizing the transfer of data over a transmission link having frequency constraints by utilizing a sequence $\alpha=(a_0, a_1, a_2 \ldots a_{n-1})$ of "$n$" multilevel signal elements having a frequency spectrum with substantially zero frequency contribution at frequency points $1/kT$ (and multiples thereof, where numerator and $k$ are relatively prime) and at $f=0$ where T is the signal element duration and:

(1) $k$ is a prime number (1, 2, 3, 5, etc.), and (2) $k$ is not a submultiple of $n$, which comprises:

(a) generating a subcode of a sequence of signals $$\alpha_j=a_j, a_{j+k}, a_{j+2k} \ldots a_{j+n'-k}$$

for $j=0, 1, \ldots k-1$, where $A_j$ is the value of the arithmetic sum of the enlarged sequence of signals $$A_j=a_j+a_{j+k}+a_{j+2k} \ldots a_{j+n'-k}$$

for $j=0, 1, \ldots k-1$, and $A_0'$, $A_1'$ are the sum of like signals ($n \cdot k$ bits) for $j=0, 1 \ldots k-1$, where $n'$ is the number of signals in a sequence $n \cdot k$, $$\alpha(n')=(a_0, a_1, a_2 \ldots a_{n-1}, a_n, a_{n+1}, \ldots a_{2n-1}\ a_{2n}, a_{2n+1} \ldots a_{3n+1} \ldots a_{nk-1}),$$

such that $A_0'=A_1'=A_2'=A'_{k-1}$;

(b) interspersing said sequences of signals to form said final signal sequence $\alpha(n')$;

(c) inverting $k$ consecutive sequences $\alpha(n')$ alternately such that $A''_0=A''_1=A''_2=A''_{k-1}=0$, where $A''$ is $2k$ characters ($2nk$ bits);

(d) applying said signal sequences to said transmission link.

9. A method for optimizing the transfer of data over a transmission link having frequency constraints by utilizing a sequence $\alpha=a_0, a_1, a_2 \ldots a_{n-1}$ of $n$ multilevel signal elements having a frequency spectrum with substantially zero frequency contribution at frequency points $1/k_1T$, $1/k_2T$, $1/k_3T$, etc. (and multiples thereof where the numerator and the respective $k_1$, $k_2$, $k_3$ are relatively prime), where T is the signal element duration and $k$ is a constant (1, 2, 3, etc.), which comprises:

(a) generating at least a single sequence of signals for each datum to be transferred in accordance with the "$k$" relationship $$\sum_{i=0}^{i=n-1} a_i e^{\frac{-j2\pi i}{k}}=0$$

which is common to the alphabet for $k_1$, $k_2$, $k_3$, etc., where $a_i$ are the multilevel signal elements $a_0$, $a_1$, $a_2 \ldots a_{n-1}$ in said sequence; and (b) applying said sequences of signals to said transmission link.

10. A method for optimizing the transfer of data over a transmission link having frequency constraints by utilizing a sequence $\alpha=(a_0, a_1, a_2, a_3 \ldots a_{n-1})$ of $n$ multilevel signal elements having a frequency spectrum with substantially zero frequency contribution at frequency points $1/kT$ and multiple thereof where the numerator and $k$ are relatively prime where T is the signal element duration which comprises:

(a) generating at least a single sequence of signals for each datum to be transferred in accordance with the relationship $$\sum_{i=0}^{i=n-1} a_i e^{\frac{-j2\pi i}{k}}=0$$

where $a_i$ are the signal elements in said sequences where each $a_i$ is multilevel signal element ($m$ element);

(b) selectively applying each individual sequence of signals in accordance with the data to be transferred to said transmission link which occupies a frequency spectrum which is equal to or less than the entire set of sequences generated in (a) above to optimize the utilization of the frequency spectrum of the entire set of sequences of signals generated as in (a).

11. A method for optimizing the transfer of data over a transmission link having frequency constraints by utilizing a sequence $\alpha=(a_0, a_1, a_2, a_3 \ldots a_{n-1})$ of $n$ multilevel signal elements having a frequency spectrum with substantially zero frequency contribution at frequency points $1/kT$ and multiple thereof where the numerator and $k$ are relatively prime where T is the signal element duration which comprises:

(a) generating a sequence of signals for data from each of $k$ data sources wherein said sequences of signals from all data are selected from the $k$ combined interspersed sequences of signals which are in accordance with $$\sum_{i=0}^{i=n-1} a_i e^{\frac{-j2\pi i}{k}}=0$$

(b) interspersing said sequences of signals to form said final sequence;

(c) applying said final sequence to said transmission link.

References Cited

UNITED STATES PATENTS

| | | |
|---|---|---|
| 3,157,745 | 11/1964 | Maezono. |
| 3,159,720 | 12/1964 | Bergmann et al. |
| 3,209,263 | 9/1965 | Keiper. |

THOMAS A. ROBINSON, Primary Examiner

U.S. Cl. X.R.

178—66, 88; 179—15; 340—347